United States Patent [19]

Tanabe

[11] Patent Number: 4,600,943
[45] Date of Patent: Jul. 15, 1986

[54] SAMPLING PULSE GENERATOR

[75] Inventor: Toshiyuki Tanabe, Fukaya, Japan

[73] Assignee: Tokyo Shibaura Denki Kabushiki Kaisha, Kawasaki, Japan

[21] Appl. No.: 548,772

[22] Filed: Nov. 4, 1983

[30] Foreign Application Priority Data

Nov. 9, 1982 [JP] Japan .................. 57-196388

[51] Int. Cl.[4] .................. H04N 7/087; H04N 7/04
[52] U.S. Cl. .................. 358/147; 328/110; 328/139; 358/142; 358/148; 375/118
[58] Field of Search ......... 358/142, 143, 144, 145, 358/146, 147, 148; 328/109, 110, 139; 375/106, 118

[56] References Cited

U.S. PATENT DOCUMENTS

| 3,509,471 | 4/1970 | Puente | 328/55 |
| 4,012,598 | 3/1977 | Wiley | 375/118 |
| 4,119,796 | 10/1978 | Jones | 328/56 |

FOREIGN PATENT DOCUMENTS

| 0023852 | 2/1981 | European Pat. Off. |
| 0037299 | 10/1981 | European Pat. Off. |
| 3103574 | 8/1984 | Fed. Rep. of Germany |
| 1202038 | 8/1970 | United Kingdom |
| 1366472 | 9/1974 | United Kingdom |
| 2069263 | 8/1981 | United Kingdom |

Primary Examiner—James J. Groody
Assistant Examiner—Michael D. Parker
Attorney, Agent, or Firm—Cushman, Darby & Cushman

[57] ABSTRACT

A sampling pulse generator utilizes sampling clocks CLi each having a frequency which corresponds to a character data signal D to be sampled. Each phase of these clocks CLi is progressively and slightly deviated from one another. One of these clocks CLi will be in-phase with the signal D. A feedback signal P1 corresponding to one of these clocks CLi is phase-compared with a clock run-in signal CR which is used as the phase reference of signal D. If signal P1 leads signal CR in phase, the suffix "i" of CLi is incremented, while the suffix "i" is decremented if signal P1 lags in phase behind signal CR. By the change of suffix "i" of clocks CLi, the phase difference between signals P1 and CR is minimized. One of the sampling clocks CLi thus obtained is used as a sampling pulse output SP of the sampling pulse generator which is substantially in-phase with the signal CR or D.

18 Claims, 58 Drawing Figures

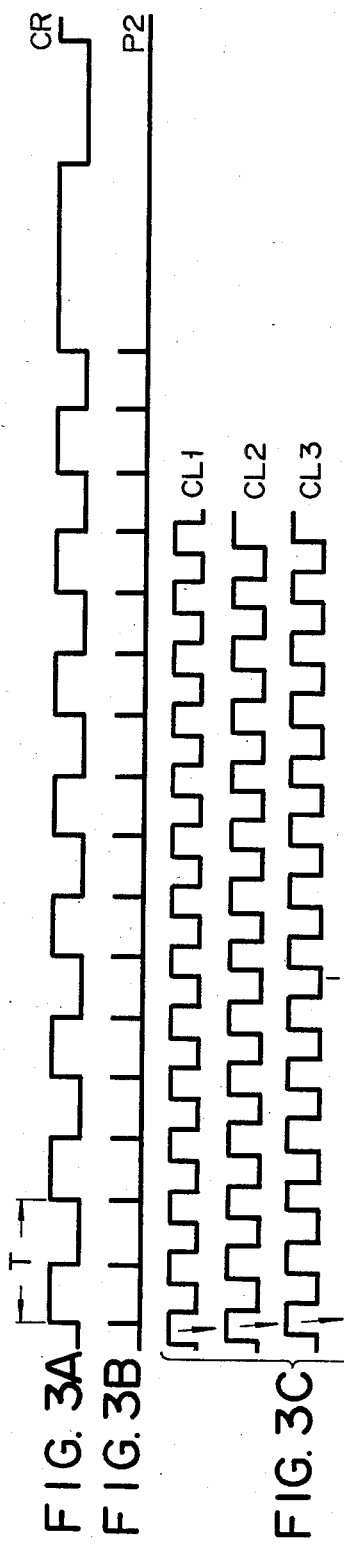
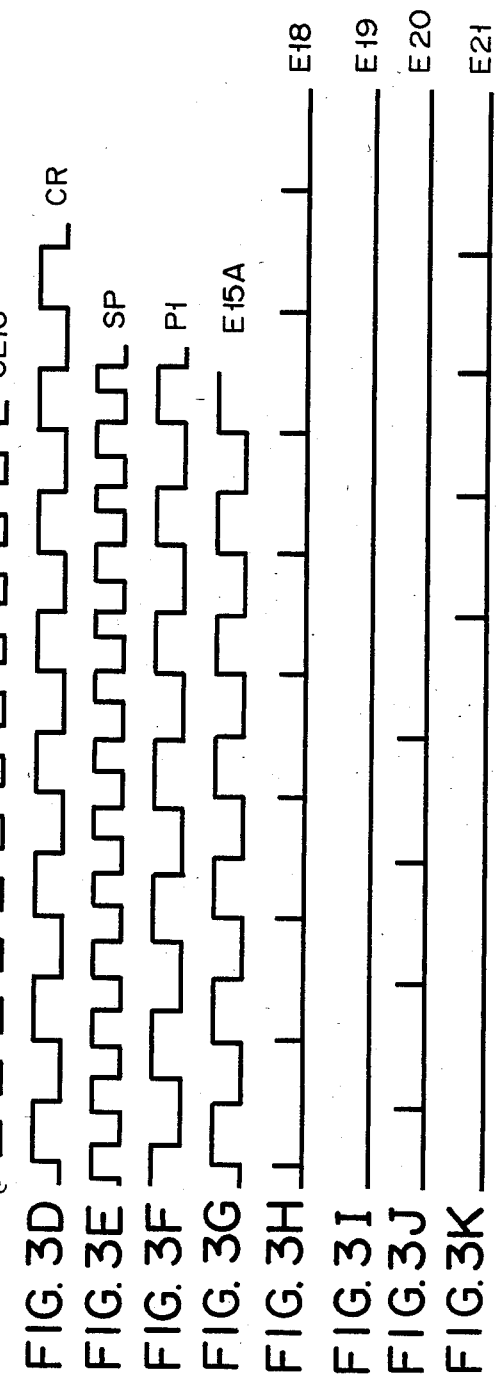

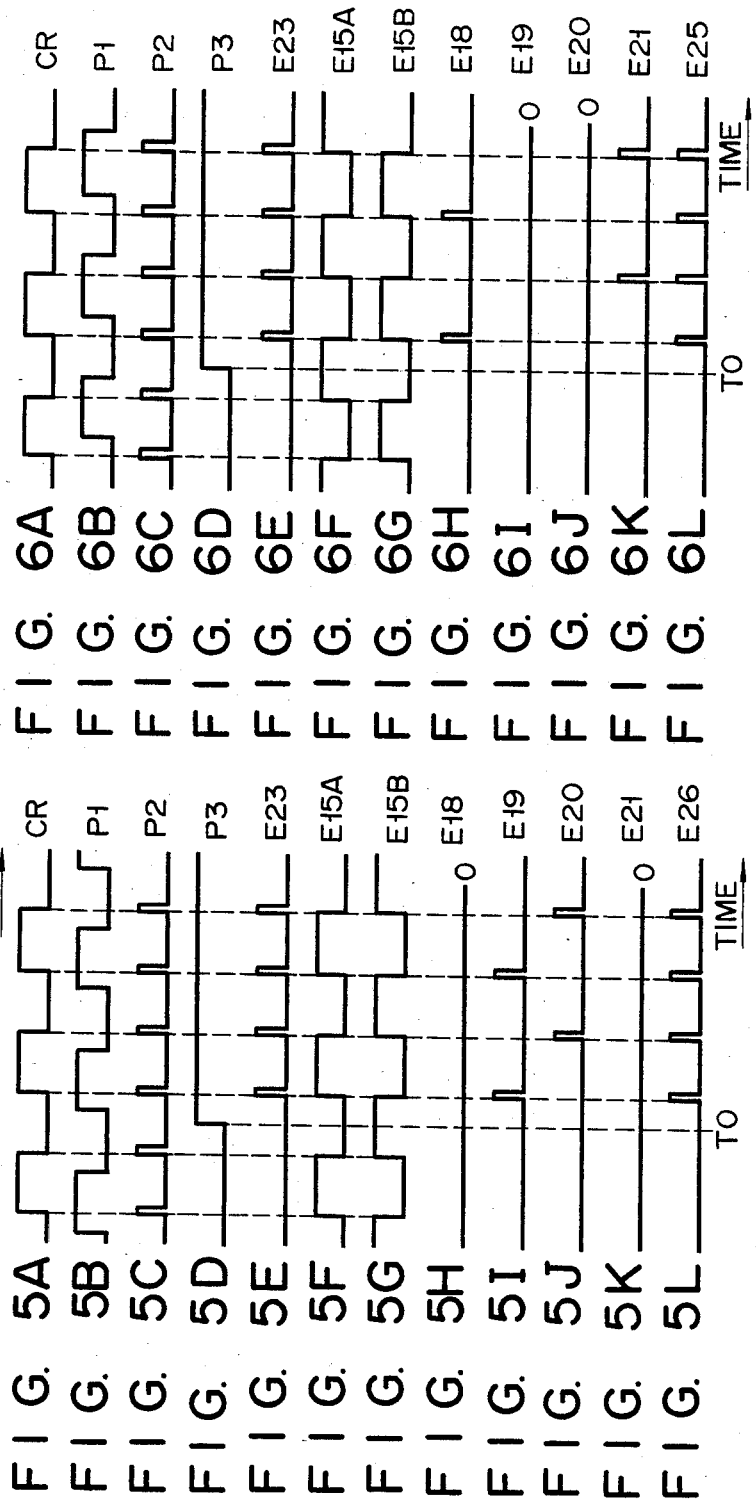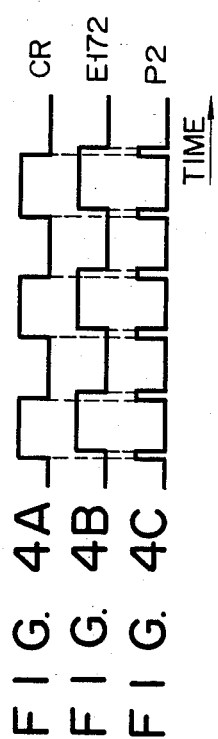

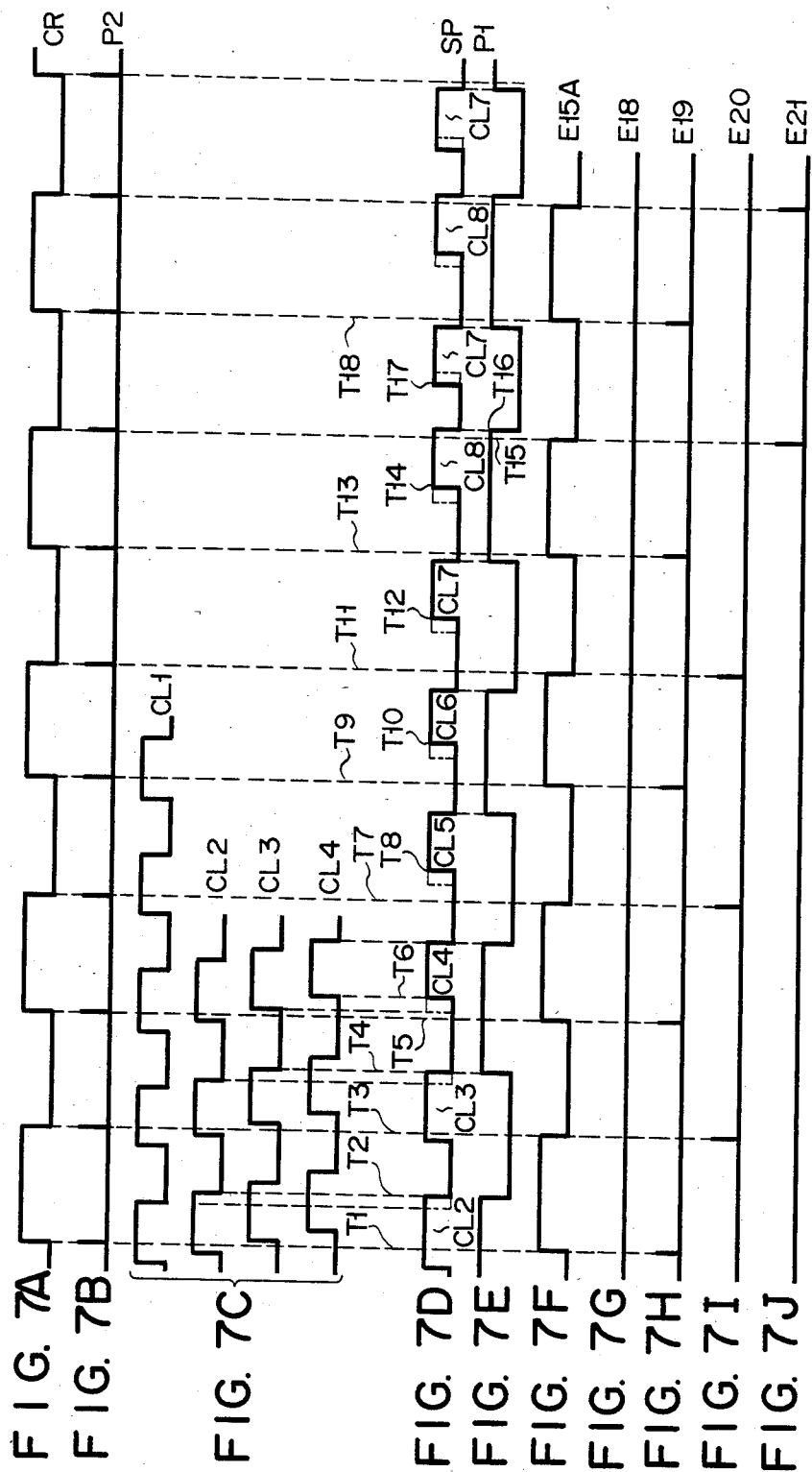

SAMPLING PULSE GENERATOR

BACKGROUND OF THE INVENTION

The present invention relates to a pulse generator for generating a pulse train which is used for sampling character data of a teletext (or videotext) system.

In a teletext system, a broadcasting station transmits a teletext signal being formed of a television broadcasting signal (video signal) and character data signal which is superposed on the video signal, and at the receiver side the character data signal is extracted from the teletext signal and the extracted signal is processed, thereby displaying character information on the CRT screen.

FIG. 1A shows a main part of the teletext signal. Character data signal D is interposed or superposed on one or more horizontal periods among the 10th to 20th horizontal periods of the vertical blanking interval. FIG. 1B shows the format of character data signal D. Signal D includes a header section A1 containing a clock run-in signal CR and framing code FC, and data section A2 in which actual character data etc., is inserted. The video signal also includes a vertical sync signal SV, horizontal sync signal SH and color burst signal SB. FIG. 1C shows the clock run-in signal CR in detail. Signal CR consists of 8 clock pulses located at the leading portion of header section A1. Signal CR serves as a reference phase of character data signal D. Various data succeeding the clock run-in signal CR is transmitted with the same bit rate as the bit rate of this signal CR. The frequency of signal CR which defines the transfer rate is selected to 4/5 fsc (fsc being color subcarrier frequency). This 4/5 fsc is a half of the transfer rate frequency (8/5 fsc) of the succeeding various data.

On the receiving side, a sampling pulse SP with 8/5 fsc being synchronized to the signal CR is generated, and character data signal D is sampled by the pulse SP. A pulse G shown in FIG. 1D is in-phase with the signal D superposed on a horizontal period. Pulse G may be called "a gate pulse". A circuit for processing character data signal D provided in the receiver side samples character data etc., during the period wherein the pulse G is generated. Then, this processing circuit transfers the sampled data to a buffer memory. At this time a framing code in character data signal D is compared with a pre-entered framing code in the memory of the processing circuit, and only when the two framing codes coincide with each other, succeeding data (sampled data) is written in the buffer memory. Data written in the buffer memory is signal-processed to obtain a character signal, and the obtained signal is supplied to a CRT for character display.

There are two different systems for obtaining the sampling pulse SP which should be synchronized to a signal to be sampled. They are an analog system and digital system. Where an analog system is utilized to sample the character data signal D, a so-called "ringing system" may be employed, wherein the oscillation of an oscillator for generating the sampling pulse is synchronized to the clock run-in signal CR as in the case of synchronizing system of a color synchronization circuit in a TV receiver.

Where a digital system is utilized to sample the character data signal D, the clock run-in signal CR is sampled by a signal having a higher frequency than the frequency of signal CR, in order to detect the phase difference between the higher frequency signal and the signal CR. Then, the oscillation of an oscillator for producing the sampling pulse is controlled according to the detected result.

Problems arise where the analog system is employed. In general the character data signal D is provided only once in each field. From this, the circuit design for obtaining reliable pull-in of synchronizing is very difficult, so that the sampling pulse SP with high precision of phase cannot be obtained. Even if several character data signals are provided in one field, reliable pull-in of synchronizing, and hence a high-phase-precision sampling pulse, also cannot be obtained. This is because the phase of character data signal D varies for each horizontal scanning period in which the signal D is inserted.

Where the digital system is employed, there are the following problems. In order to keep the phase deviation of sampling pulse SP within 20 ns, for example, a signal having 8 times as high as the frequency of clock run-in signal CR is required. As mentioned before, the frequency of clock run-in signal CR is 4/5 fsc, which is very high. Therefore, a circuit dealing with signals having 8 times as high (32/5 fsc) must be adopted by circuit elements of the high speed type so as to meet the requirement of high speed operation. However, this causes a substantial increase in the manufacturing cost.

SUMMARY OF THE INVENTION

It is accordingly an object of the present invention to provide a sampling pulse generator which can generate highly precise sampling pulses without use of an excessive high frequency signal.

To achieve the above object a sampling pulse generator of the invention utilizes n sampling clocks CLi (i=1, 2, 3, ..., n) each of which has a frequency which corresponds to the frequency of a character data signal D to be sampled. Each phase of these clocks CLi is progressively and slightly deviated from one another. One of the clocks CLi will be in-phase with the signal D. A signal P1 corresponding to one of these sampling clocks CLi is phase-compared with a signal CR which is used as the phase reference of the signal D. If the former (P1) is leading the latter (CR) in phase, the suffix "i" of CLi is, e.g., incremented, while the suffix "i" is decremented if the former is lagging in phase behind the latter. Then, the clock CLi obtained when the signal P1 becomes in-phase with the signal CR is selected as a sampling pulse output SP for sampling the signal D.

According to the present invention, the frequency (8/5 fsc) of sampling clocks CLi may be two times higher than that (4/5 fsc) of the signal D to be sampled. Thus, no excessive high frequency signal is needed. Further, since the frequency and phase of respective sampling clocks CLi are individually predetermined and the selected one of such clocks is used for sampling, highly precise sampling pulses can be obtained.

BRIEF DESCRIPTION OF THE DRAWINGS

FIGS. 3A to 7J show waveforms at respective portions of the sampling pulse generator shown in FIG. 2;

DETAILED DESCRIPTION OF THE PREFERRED EMBODIMENT

An embodiment of the present invention will now be described in detail with reference to the accompanying drawings.

Figure 1:
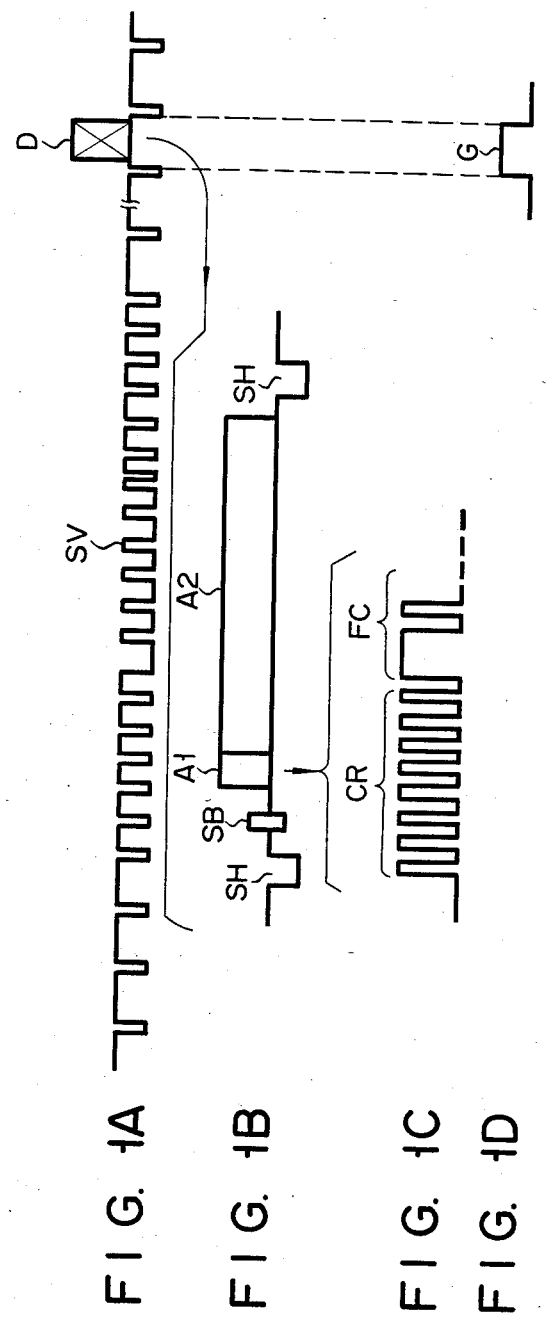
FIGS. 1A to 1D show the contents of a teletext signal.
Figure 2:
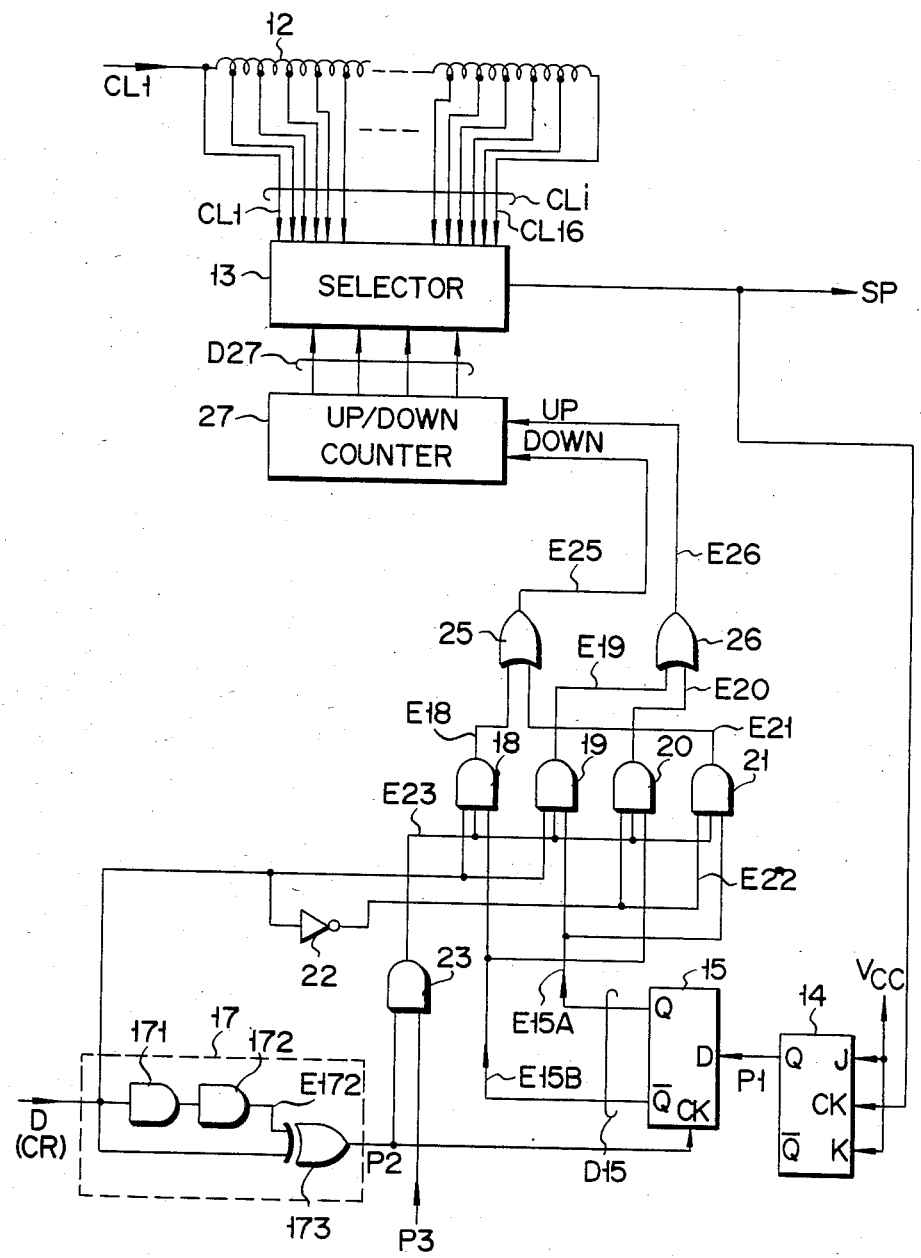
FIG. 2 shows a circuit configuration of a sampling pulse generator according to the present invention.

Referring to FIG. 2 a delay line 12 having plural taps receives a sampling clock CL1. Line 12 may be formed of an LC delay line, CCD delay line, etc. Line 12 delays the inputted clock CL1 and outputs (n−1) delayed pulses from the respective taps. Clock CL1 and the (n−1) delayed pulses are used as n sampling clocks CLi (i=1, 2, 3, ..., n). The frequency of each of these clocks CLi are the same (8/5 fsc), but these clocks CLi respectively have different phases as shown in FIG. 3C. Here, the frequency of clocks CLi is selected to be double (8/5 fsc) of the frequency (4/5 fsc) of a character data signal D. When delay line 12 has 15 taps, for example, 16 sampling clocks CL1 to CL16 can be obtained. In this case the delay time for each tap of line 12 is T/2×1/16=T/32 (T being one period of a 4/5 fsc clock run-in signal CR as shown in FIG. 3A, and the signal CR being a part of the signal D as seen from FIGS. 1A to 1C). This delay time T/32 corresponds to the phase difference of respective clocks CLi derived from the adjacent taps of delay line 12. Such sampling clocks CLi (i=1, 2, 3, ..., 16) are supplied to a clock selector 13.

Selector 13 selects one pulse train from the inputted sampling clocks CLi according to the content of 4-bit designation data D27 supplied from an up/down counter 27. For instance, when the content of data D27 is "0010" (corresponding to decimal "2"), one pulse train corresponding to the clock CL3 is selected by selector 13. The selected clock CL3 from selector 13 is used as a sampling pulse SP.

Selector 13 may be a conventional device and is commercially available. Examples for such a device are: #SN54150, #SN54151A, #SN54152A, etc., manufactured by Texas Instrument Inc., USA.

Pulse SP is supplied to a clock input ck of a J-K flip-flop 14 whose J and K inputs receive a power supply potential Vcc corresponding to the logic "1" level. Flip-flop 14 generates from its Q output a feedback signal P1 having a ½ frequency of pulse SP (FIGS. 3E, 3F). The feedback signal P1 is phase-compared with the signal CR. The flip-flop 14 functions as a frequency converter or ½ frequency divider and may be a T flip-flop.

Feedback signal P1 is supplied to the D input of a D flip-flop 15. Flip-flop 15 receives at its clock input ck a clock signal P2 which appears at the level change point of clock run-in signal CR (FIGS. 3A, 3B). Signal P2 is obtained from an EXOR gate 173. EXOR gate 173 receives at its one input the character data signal D containing the clock run-in signal CR and at its other input a delayed signal E172 which is obtained by delaying the signal D through a series circuit of two AND gates 171 and 172. EXOR gate 173 generates clock signal P2 when the logical level of delayed signal E172 is opposite to that of clock run-in signal CR (FIGS. 4A to 4C). The pulse width of clock signal P2 is determined by the delay time of the series circuit of gates 171 and 172.

The circuit elements 171 to 173 constitute a frequency doubler 17 outputting a narrow-width frequency-doubled pulse (P2).

D flip-flop 15 compares the phase of feedback signal P1 with that of clock run-in signal CR. When the signal P1 is leading the signal CR in phase (FIGS. 5A and 5B), flip-flop 15 provides from its Q output a first gate signal E15A being equal to the clock run-in signal CR (FIG. 5F). When the signal P1 is lagging in phase behind the signal CR (FIGS. 6A and 6B), flip-flop 15 provides from its inverted Q output a second gate signal E15B being equal to the clock run-in signal CR (FIG. 6G). Signals E15A and E15B have an antiphase relation and jointly constitute gate data D15.

First gate signal E15A is supplied to one input of each of AND gates 19 and 21. Second gate signal E15B is supplied to one input of each of AND gates 18 and 20. Respective second inputs of AND gates 18 and 19 receive clock run-in signal CR contained in data signal D. Signal D is phase-inverted via an inverter 22. Inverter 22 outputs an inverted signal E22 having an opposite phase to the phase of signal CR. Signal E22 is supplied to respective second inputs of AND gates 20 and 21. Respective third inputs of AND gates 18 to 21 receive a clock pulse E23. Pulse E23 is obtained from an AND gate 23. AND gate 23 receives the clock signal P2 and a gate signal P3, and outputs the pulse E23 according to the logical AND of signals P2 and P3. The pulse width of gate signal P3 is identical with a time period in which the clock run-in signal CR appears. Accordingly, clock signal P2 passes AND gate 23 during the above time period of clock run-in signal CR, and the signal P2 passed through AND gate 23 becomes the pulse E23. Gate signal P3 is supplied from an outside of the configuration of FIG. 2 when the signal P2 should be transferred to AND gates 18 to 21.

An output E18 from AND gate 18 is supplied to one input of an OR gate 25, and an output E21 from AND gate 21 is supplied to the other input of OR gate 25. An output E19 from AND gate 19 is supplied to one input of an OR gate 26, and an output E20 from AND gate 20 is supplied to the other input of OR gate 26. OR gate 26 supplies an up count signal E26 to the up count input of up/down counter 27. Counter 27 receives at its down count input a down count signal E25 from OR gate 25.

Counter 27 up-counts the signal E26 or down-counts the signal E25, and provides the count result as said designation data D27. When counter 27 is an n-bit binary counter, $2^n$ kinds of selection at the selector 13 can be performed. When 16 kinds of sampling clocks CL1 to CL16 are to be supplied to the selector 13, 4-bit counter 27 is satisfactory. The selected sampling clock CLi (i is any one of 1 to 16) from selector 13 becomes the sampling pulse output SP.

Incidentally, although not shown, the character data signal D of the teletext system may be obtained using conventional circuitries as follows. First, a video signal from a video detector is level-sliced by a slicing circuit or level comparator. This slicing operation is performed such that the sliced output has a 50% duty cycle. Then, the sliced output is converted into the signal D having TTL level through a wave shaper.

The sampling pulse generator having the configuration of FIG. 2 will operate as follows.

When the phase of sampling pulse output SP leads the target or the phase of clock run-in signal CR in the data signal D, since output SP is in-phase with feedback signal P1, the phase of signal P1 also leads the phase of signal CR (FIGS. 5A, 5B). As seen from FIGS. 4A to 4C, clock signal P2 appears just after the level change point or the signal edge of signal CR. If D flip-flop 15 is clocked by signal P2 when the level of D input (signal P1) is logical "0", the level of signal E15A from the Q output of flip-flop 15 becomes "0" (FIGS. 5B, 5C, 5F). If D flip-flop 15 is clocked by signal P2 when the level of D input (signal P1) is logical "1", the level of signal E15A from the Q output of flip-flop 15 becomes "1" (FIGS. 5B, 5C, 5F). In this case, signal E15A becomes in-phase with clock run-in signal CR and signal E15B becomes anti-phase with signal CR (FIGS. 5A, 5F, 5G).

When the logical level of clock gate signal P3 is "0", the logical level of clock pulse E23 is also "0" (before time T0 in FIGS. 5D, 5E). Then, all AND gates 18 to 21 are closed, and no signal is outputted from any of these AND gates (before T0 in FIGS. 5H to 5K). When the logical level of clock gate signal P3 is "1", AND gate 23 outputs clock pulse E23 corresponding to clock signal P2 (after T0 in FIGS. 5C to 5E).

AND gate 18 receives signal CR, pulse E23 and signal E15B. The logical level of signal E15B is always "0" when the logical levels of CR and E23 are both "1" (FIGS. 5A, 5E, 5G). Accordingly, no signal is obtained from AND gate 18 (FIG. 5H). AND gate 21 receives signal E22 (corresponding to the inverted signal of signal CR), pulse E23 and signal E15A. The logical level of signal E15A is always "0" when the logical levels of E22 and E23 are both "1" (inversion of FIG. 5A and FIGS. 5E, 5F). Accordingly, no signal is obtained from AND gate 21 (FIG. 5K).

AND gate 19 receives signal CR, pulse E23 and signal E15A. The logical level of signal E15A is always "1" when the logical levels of CR and E23 are both "1" (FIGS. 5A, 5E, 5F). Accordingly, output E19 is obtained from AND gate 19 (FIG. 5I). AND gate 20 receives signal E22, pulse E23 and signal E15B. The logical level of signal E15B is always "1" when the logical levels of E22 and E23 are both "1" (inversion of FIG. 5A and FIGS. 5E, 5G). Accordingly, output E20 is obtained from AND gate 20 (FIG. 5J).

The logical OR of outputs E19 and E20 thus obtained becomes the up count signal E26 (FIG. 5L). Counter 27 up-counts the signal E26 so long as the signal P1 leads the signal CR in phase. The suffix "i" of sampling clock CLi selected by selector 13 is incremented as the content or counted value of counter 27 is incremented by the up-counting. From this, the phase of selected sampling pulse output SP is gradually lagged until feedback signal P1 becomes in-phase with clock run-in signal CR.

When the phase of sampling pulse output SP lags behind the target or the phase of clock run-in signal CR in the data signal D, since output SP is in-phase with feedback signal P1, the phase of signal P1 also lags behind the phase of signal CR (FIGS. 6A, 6B). If D flip-flop 15 is clocked by signal P2 when the level of D input (signal P1) is logical "0", the level of signal E15A from the Q output of flip-flop 15 becomes "0" (FIGS. 6B, 6C, 6F). If D flip-flop 15 is clocked by signal P2 when the level of D input (signal P1) is logical "1", the level of signal E15A from the Q output of flip-flop 15 becomes "1" (FIGS. 6B, 6C, 6F). In this case, signal E15A becomes anti-phase with clock run-in signal CR and signal E15B becomes in-phase with signal CR (FIGS. 6A, 6F, 6G).

When the logical level of clock gate signal P3 is "0", the logical level of clock pulse E23 is also "0" (before time T0 in FIGS. 6D, 6E). Then, all AND gates 18 to 21 are closed, and no signal is outputted from any of these AND gates (before T0 in FIGS. 6H to 6K). When the logical level of clock gate signal P3 is "1", AND gate 23 outputs clock pulse E23 corresponding to clock signal P2 (after T0 in FIGS. 6C to 6E).

AND gate 18 receives signal CR, pulse E23 and signal E15B. The logical level of signal E15B is always "1" when the logical levels of CR and E23 are both "1" (FIGS. 6A, 6E, 6G). Accordingly, output E18 is obtained from AND gate 18 (FIG. 6H). AND gate 21 receives signal E22 (corresponding to the inverted signal of signal CR), pulse E23 and signal E15A. The logical level of signal E15A is always "1" when the logical levels of E22 and E23 are both "1" (inversion of FIG. 6A and FIGS. 6E, 6F). Accordingly, output E21 is obtained from AND gate 21 (FIG. 6K).

AND gate 19 receives signal CR, pulse E23 and signal E15A. The logical level of signal E15A is always "0" when the logical levels of CR and E23 are both "1" (FIGS. 6A, 6E, 6F). Accordingly, no signal is obtained from AND gate 19 (FIG. 6I). AND gate 20 receives signal E22, pulse E23 and signal E15B. The logical level of signal E15B is always "0" when the logical levels of E22 and E23 are both "1" (inversion of FIG. 6A and FIGS. 6E, 6G). Accordingly, no signal is obtained from AND gate 20 (FIG. 6J).

The logical OR of outputs E18 and E21 thus obtained becomes the down count signal E25 (FIG. 6L). Counter 27 down-counts the signal E25 so long as the signal P1 lags behind the signal CR in phase. The suffix "i" of sampling clock CLi selected by selector 13 is decremented as the content or counted value of counter 27 is decremented by the down-counting. From this, the phase of selected sampling pulse output SP is gradually advanced until feedback signal P1 becomes in-phase with clock run-in signal CR.

A phase-locking operation of the sampling pulse output SP to the clock run-in signal CR in character data signal D will be described in conjunction with a case wherein the feedback signal P1 leads the signal D or CR in phase.

Suppose that the content of counter 27 is now "0000" and the sampling clock CL1 is selected by selector 13 (FIG. 7C). Clock signal P2 appears at time T1 is supplied via gates 23, 19 and 26 to the up count input of counter 27 (FIG. 7B). This signal P2 corresponds to the output E19 from AND gate 19 (FIG. 7H). Then, the content of counter 27 is changed form "0000" to "0001", and selector 13 selects sampling clock CL2 (FIG. 7C). At this time the content of sampling pulse output SP is changed from CL1 to CL2 (at time T2 in FIG. 7D). Subsequent signal P2 at time T3 corresponding to output E20 (FIG. 7I) is supplied to the up count input of counter 27, so that the content of counter 27 is incremented to "0010" and sampling clock CL3 is selected as sampling pulse output SP (T4 in FIG. 7D). Similarly, subsequent pulses of signal P2 at T5, T7, T9, T11 and T13 are up-counted by counter 27, and the contents of sampling pulse output SP are subsequently changed from CL3 to CL8 (FIG. 7D).

When sampling clock CL8 is selected at T13, the phase of feedback signal P1 is slightly delayed or lagged behind the phase of clock run-in signal CR as seen from times T15 and T16 in FIGS. 7A and 7E. At this time the clock signal P2 at T15 appears as the output E21 and is supplied to the down count input of counter 27 via OR gate 25 (FIGS. 7B, 7J). Counter 27 downcounts the down count input E25 corresponding to this output E21. Then, the content of counter 27 is changed from "0111" for selecting CL8 to "0110" for selecting CL7 (at time T17 in FIG. 7D). When sampling clock CL7 is selected at T15, the phase of signal P1 slightly advances or leads the phase of signal CR (at time T18 in FIGS. 7A, 7E). Then, counter 27 up-counts the output E19 corresponding to the clock signal P2 at time T18 (FIGS. 7B, 7H), and the content of sampling pulse output SP is changed from CL7 to CL8 (FIG. 7D). After this, counter 27 down-counts the output E21 and up-counts the output E19, alternatively. Thus, the content of counter 27 is converged to either of "0110" and "0111" and, therefore, the content of sampling pulse output SP becomes sampling clock CL7 or CL8 which is substantially in-phase with clock run-in signal CR. Accordingly, a sampling pulse output SP substantially in-phase with data signal D is obtained. When delay line 12 has 15 taps and the delay time for each tap is T/32 as mentioned earlier, the deviation of phase between output SP and signal CR or D is at most T/32 (sec) or 360/32 (angular degree). Such deviation can be practically negligible for sampling data used in a teletext system.

Incidentally, a sampling pulse output SP produced by the configuration of FIG. 2 includes jitter caused by the alternative selection of two adjacent sampling clocks (e.g., CL7 and CL8). The maximum amount of such jitter is T/32 when 15-tap delay line 12 is used. If a 31-tap delay line 12 and 5-bit binary counter 27 is used, 32 kinds of sampling clocks CLi are provided. In this case the maximum amount of jitter is T/64. If a smaller amount of jitter is required, a delay line 12 having more taps and a larger bit number counter 27 should be used in the configuration of FIG. 2.

Figure 8:
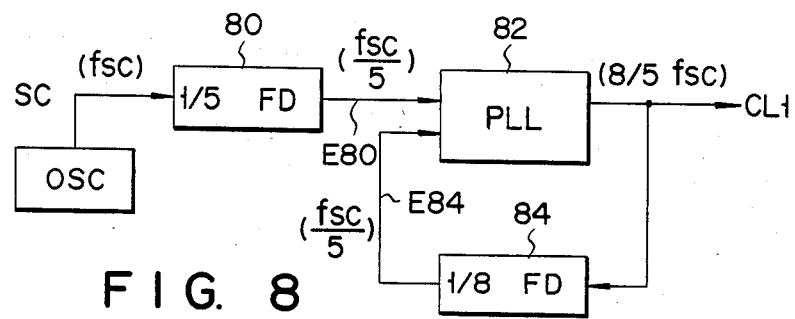
FIG. 8 shows a configuration of a generator for producing a sampling clock CL1 from a reference signal having a color subcarrier frequency fsc.

FIG. 8 shows a configuration of a generator for producing the sampling clock CL1. A color subcarrier signal SC having a subcarrier frequency fsc is 1/5 frequency divded by a frequency divider 80. Divider 80 supplies a 1/5 fsc signal E80 to a PLL (phase locked loop) circuit 82 which may be a conventional one. For instance, #NE564 manufactured by Signatics Co., USA may be used for PLL circuit 82. Circuit 82 receives a feedback signal E84 having 1/5 fsc frequency, and generates the 8/5 fsc sampling clock CL1. This clock CL1 is converted to the feedback signal E84 by a ⅛ frequency divider 84. PLL circuit 82 operates such that the phase difference between signals E80 and E84 becomes minimum. Then, 8/5 fsc clock CL1 being exactly synchronized to color subcarrier signal SC is obtained.

Figure 9:
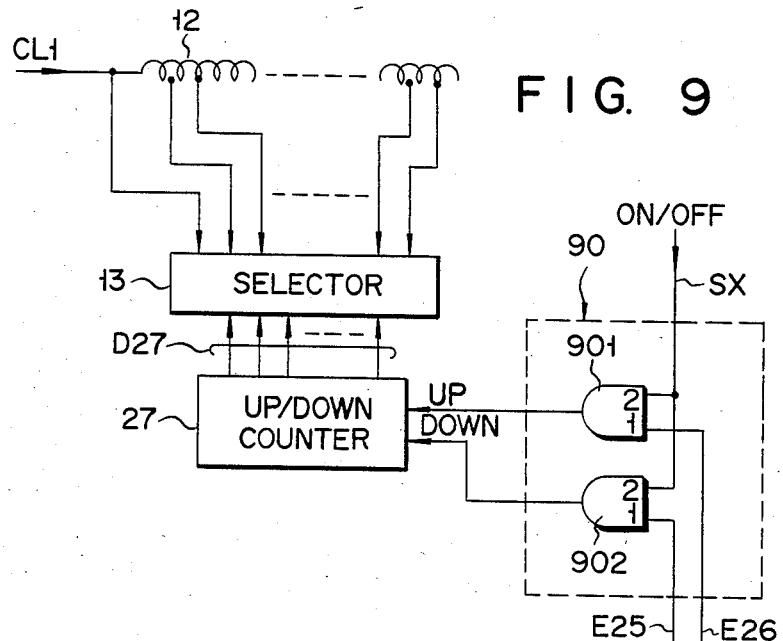
FIG. 9 shows a modification of the configuration of FIG. 2.

FIG. 9 partially shows a modification of FIG. 2. Up count signal E26 is supplied via the first input of an AND gate 901 to the up-count input of counter 27. Down count signal E25 is supplied via the first input of an AND gate 902 to the down-count input of counter 27. Each second input of gates 901 and 902 receives an on/off instruction SX obtained from outside of the sampling pulse generator of the invention. AND gates 901 and 902 constitute a switch circuit 90. This circuit 90 is inserted in the closed feedback loop of FIG. 2 which is formed of the elements 13, 14, 15, 18–26 and 27. Circuit 90 opens the closed feedback loop when on/off instruction SX has logical "0" and closes it when instruction SX has logical "1".

According to the configuration of FIG. 9, said jitter mentioned in the description of FIG. 2 can be eliminated. Thus, after the phase of feedback signal P1 has converged to the phase of clock run-in signal CR (after T16 in FIGS. 7A, 7D, 7E), the content of on/off instruction SX is changed from "1" to "0" so that said closed feedback loop is opened. Then, no counting operation is carried out at counter 27 and the content of designation data D27 from counter 27 is fixed. Accordingly, after the feedback loop has opened at P1=CR, the content of sampling pulse output SP is fixed to the particular one of sampling clocks CLi, and no jitter is involved in the output SP. The deviation of phase of output SP from the phase of signal CR, or the phase error between SP and CR, depends on the minuteness of phase difference between the adjacent sampling clocks CLi (e.g., between CL7 and CL8). Such phase deviation or phase error can be minimized by increasing the number of taps of delay line 12, the bit number of counter 27 and the selection capacity of selector 13.

Figure 9A:
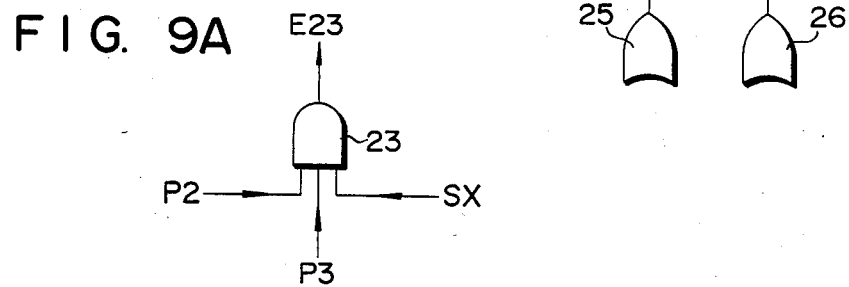
FIG. 9A shows an alternative modification of the configuration of FIG. 9.

FIG. 9A shows a modification of FIG. 9. In FIG. 9A, a three input AND gate 23 receiving signals P2, P3 and SX is used in place of switch circuit 90 of FIG. 9.

Figure 10:
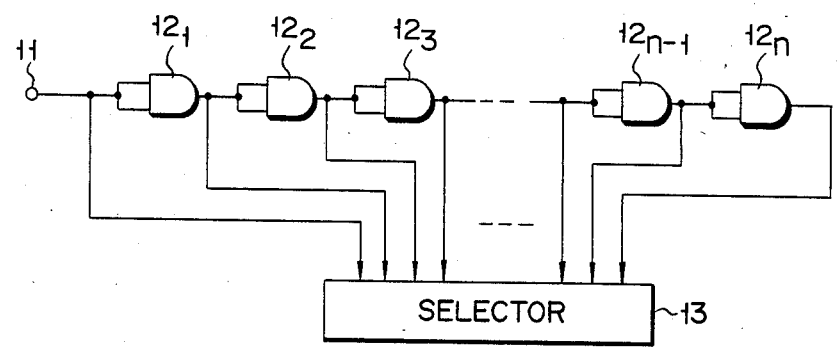
FIG. 10 shows a modification of the delay line 12 in FIG. 2.

FIG. 10 shows a modification of LC delay line 12 in FIG. 2. In FIG. 10, n series connected AND gates $12_1$ to $12_n$ are used in place of (n−1) taps delay line 12 of FIG. 2.

Figure 11:
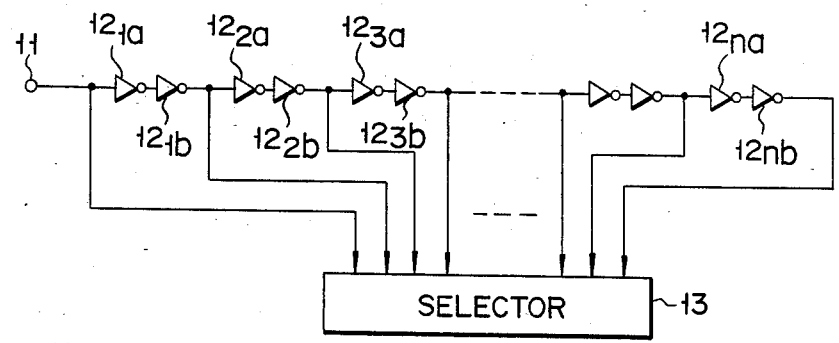
FIG. 11 shows another modification of the delay line 12 in FIG. 2.

FIG. 11 shows a modification of FIG. 10. In FIG. 11, two series connected inverters $12_{na}$ and $12_{nb}$ are used for AND gate $12_n$.

Although not shown, each delay element shown in FIG. 10 or 11 may be changed by any other delay element (e.g., CR integrator). Further, shift register, CCD or BBD may be used for delay line 12.

As described above, sampling pulse output SP being exactly syncronized in phase to clock run-in signal CR can be obtained by detecting the phase difference between feedback signal P1 and clock run-in signal CR for each level change point (signal edge) of signal CR, as well as by detecting the advance or delay of the phase of sampling pulse output SP. With this configuration, the signal frequency to be handled in the circuitry is at most the transfer rate frequency (8/5 fsc) of character information in the data signal D. Accordingly, a sampling pulse generator of the present invention does not require an excessive high frequency signal. Further, highly precise sampling pulse output SP having less phase error can be obtained by increasing the number of taps of delay line 12. Furthermore, the phase correction of output SP can be done for each packet of character data signal D, thereby not requiring the phase-continuity between adjacent packets of character data signal D.

The foregoing embodiment of the invention is by no means limitative, and various changes and modifications thereof are possible. For example, the frequency of reference signal CL1 may be equal to the frequency (4/5 fsc) of clock run-in signal CR, and the selected signal from selector 13 may be directly used as the feedback signal P1. In this case, the selected signal from selector 13 should be doubled by a frequency doubler to obtain 8/5 fsc sampling pulse output SP. Data to be sampled by the output SP may be any data other than character data. For instance, an arbitrary symbolic data (figure data, etc.) may be sampled by output SP.

As has been described, according to the present invention it is possible to obtain a sampling pulse generator which can produce highly precise or accurate sampling pulses without the use of an excessive high frequency signal which would lead to increased manufacturing costs for the sampling pulse generator.

What is claimed is:

1. A sampling pulse generator for use in sampling a character or symbolic data signal in a transmitted data signal, said symbolic data signal containing a clock run-in signal which is used as a phase reference of this symbolic data signal, said sampling pulse generator comprising:

signal source means for generating a reference signal having a frequency corresponding to the frequency of said symbolic data signal to be sampled;

delay means coupled to said signal source means, for delaying said reference signal and providing a plurality of sampling clocks, the frequency of each of said sampling clocks being equal to the frequency of said reference signal, and each phase of said sampling clocks with respect to said reference signal having an individual value;

selector means coupled to said delay means and being responsive to designation data, for selecting a smpling pulse output from said sampling clocks according to the content of said designation data;

designation means coupled to said selector means and being responsive to gate data, for generating said designation data such that the content of said designation data is incremented or decremented according to the content of said gate data; and comparator means coupled to said selector means and to said designation means, for generating a feedback signal which is in-phase and synchronized with said sampling pulse output, and for comparing the phase of said feedback signal with that of said clock run-in signal and generating said gate data according to the result of comparison, said selector means selecting a particular one of said sampling clocks based on the result of comparison in said comparator means, so that the phase difference between said feedback signal and said clock run-in signal becomes minimum and the selected particular one of said sampling clocks is used as said sampling pulse output;

said selector means, designation means and comparator means jointly forming a closed negative feedback loop which operates to minimize the phase difference between said feedback signal and said clock run-in signal which is the control target of said feedback loop;

said closed negative feedback loop including means responsive to an on/off instruction, for opening said closed feedback loop when the content of said on/off instruction indicates the "off" of the negative feedback operation, so that the content of said designation data is fixed, said feedback loop being closed when the content of said on/off instruction indicates the "on" of the negative feedback operation.

2. A sampling pulse generator for use in sampling a character or symbolic data signal in a serially transmitted data signal, said symbolic data signal containing a clock run-in signal which is used as a phase reference of this symbolic data signal, said sampling pulse generator comprising:

means for generating a pulse train having a bit rate corresponding to the bit rate of said symbolic data signal;

delay means coupled to said generating means, for delaying said pulse train and providing a plurality of delayed signals in such a way that each phase of said delayed signals with respect to said pulse train has an individual value;

selector means coupled to said delay means, for selecting one of said delayed signals as a data sampling pulse;

detector means coupled to said selected means and being responsive to said clock run-in signal, for detecting the phase difference between the selected one of said delayed signals with that of said clock run-in signal and providing a control signal; and control means coupled to said selector means and said detector means, for controlling said selector means according to said control signal, such that the phase difference between said selected one delayed signal and said clock run-in signal becomes minimum;

said detector means including:

means for extracting from said symbolic data signal a reference phase signal corresponding to said clock run-in signal;

comparator means coupled to said extracting means and said selector means, for comparing the phase difference between said selected one delayed signal and said reference phase signal and providing a comparison result; and means coupled to said comparator means and said control means, for producing said control signal from said comparison result and said clock run-in signal.

3. A generator according to claim 1, wherein said comparator means includes:

a first frequency converter for converting the frequency of said sampling pulse output into the frequency of said feedback signal, and providing the conversion result as said feedback signal;

a phase comparator for comparing the phases of said feedback signal and clock run-in signal, generating a first gate signal when said feedback signal is leading said clock run-in signal in phase, and generating a second gate signal when said feedback signal is lagging in phase behind said clock run-in signal, said first and second gate signals constituting said gate data, and wherein said first gate signal is generated for incrementing the content of said designation data and said second gate signal is generated for decrementing the content of said designation data.

4. A generator according to claim 3, wherein said phase comparator includes:

a second frequency converter for converting the frequency of said clock run-in signal into the frequency of said sampling pulse output, and generating a clock signal having the same frequency as that of said sampling pulse output; and a D type flip-flop receiving at its D input said feedback signal and being clocked by said clock signal, and generating said first and second gate signals from its Q and inverted Q outputs.

5. A generator according to claim 4, wherein said designation means includes:

a gate circuit responsive to said data signal and gate data, for providing an up count signal being synchronized with said data signal when said gate data is said first gate signal, and providing a down count signal being synchronized with said data signal when said gate data is said second gate signal; and an up/down counter for up-counting said up count signal when said gate data is said first gate signal, and for down-counting said down count signal when said gate data is said second gate signal, the count result of said up/down counter being used as said designation data.

6. A generator according to claim 4, wherein said delay means is provided with a third frequency converter responsive to a subcarrier signal having a color subcarrier frequency of TV system, for converting said subcarrier signal into the frequency of said reference signal, and wherein said data signal includes character information of a teletext or videotex system, the frequency of which information is the half of the frequency of said sampling pulse output.

7. A generator according to claim 5, wherein said gate circuit includes:
- a first AND gate for providing a first output corresponding to the logical AND of said second gate signal and said data signal;
- a second AND gate for providing a second output corresponding to the logical AND of said first gate signal and said data signal;
- a third AND gate for providing a third output corresponding to the logical AND of said second gate signal and an inverted signal of said data signal;
- a fourth AND gate for providing a fourth output corresponding to the logical AND of said first gate signal and said inverted signal;
- a first OR gate coupled to said second and third AND gates, for providing said up count signal corresponding to the logical OR of said second and third outputs; and
- a second OR gate coupled to said first and fourth AND gates, for providing said down count signal corresponding to the logical OR of said first and fourth outputs.

8. A generator according to claim 7, wherein said gate circuit further includes:
- a fifth AND gate responsive to a clock signal having the same frequency as that of said sampling pulse output and to a clock gate signal, for providing a clock pulse corresponding to the logical AND of said clock signal and clock gate signal, and
- wherein said clock pulse is supplied as an AND input signal to each of said first to fourth AND gates, the frequency of said clock pulse defining the counting rate of said up/down counter.

9. A generator according to claim 4, wherein said second frequency converter is a frequency doubler and includes:
- a delay element for delaying said clock run-in signal by a given time to provide a delayed signal;
- a gate responsive to said delayed signal and clock run-in signal, for generating said clock signal when the logical level of said delayed signal is opposite to that of said clock run-in signal.

10. A sampling pulse generator for use in sampling a character or symbolic data signal in a transmitted data signal, said symbolic data signal containing a clock run-in signal which is used as a phase reference of this symbolic data signal, said sampling pulse generator comprising:

signal source means for generating a reference signal having a frequency corresponding to the frequency of said symbolic data signal to be sampled;

delay means coupled to said signal source means, for delaying said reference signal and providing a plurality of sampling clocks, the frequency of each of said sampling clocks being equal to the frequency of said reference signal, and each phase of said sampling clocks with respect to said reference signal having an individual value;

selector means coupled to said delay means and being responsive to designation data, for selecting a sampling pulse output from said sampling clocks according to the content of said designation data;

designation means coupled to said selector means and being responsive to gate data, for generating said designation data such that the content of said designation data is incremented or decremented according to the content of said gate data; and comparator means coupled to said selector means and to said designation means, for generating a feedback signal which is in-phase and synchronized with said sampling pulse output, and for comparing the phase of said feedback signal with that of said clock run-in signal and generating said gate data according to the result of comparison, said selector means selecting a particular one of said sampling clocks based on the result of comparison in said comparator means, so that the phase difference between said feedback signal and said clock run-in signal becomes minimum and the selected particular one of said sampling clocks is used as said sampling pulse output;

said comparator means including:
- a first frequency converter for converting the frequency of said sampling pulse output into the frequency of said feedback signal, and providing the conversion result as said feedback signal;
- a phase comparator for comparing the phases of said feedback signal and clock run-in signal, generating a first gate signal when said feedback signal is leading said clock run-in signal in phase, and generating a second gate signal when said feedback signal is lagging in phase behind said clock run-in signal, said first and second gate signals constituting said gate data; and
- wherein said first gate signal is generated for incrementing the content of said designation data and said second gate signal is generated for decrementing the content of said designation data;

said phase comparator including:
- a second frequency converter for converting the frequency of said clock run-in signal into the frequency of said sampling pulse output, and generating a clock signal having the same frequency as that of said sampling pulse output; and
- a D type flip-flop receiving at its D input said feedback signal and being clocked by said clock signal, and generating said first and second gate signals from its Q and inverted Q outputs.

11. A generator according to claim 10, wherein said designation means includes:
- a gate circuit responsive to said data signal and gate data, for providing an up count signal being synchronized with said data signal when said gate data is said first gate signal, and providing a down count signal being synchronized with said data signal when said gate data is said second gate signal; and an up/down counter for up-counting said up count signal when said gate data is said first gate signal, and for down-counting said down count signal when said gate data is said second gate signal, the count result of said up/down counter being used as said designation data.

12. A generator according to claim 10, wherein said delay means is provided with a third frequency converter responsive to a subcarrier signal having a color subcarrier frequency of TV system, for converting said subcarrier signal into the frequency of said reference signal, and wherein said data signal includes character information of a teletext or videotex system, the frequency of which information is the half of the frequency of said sampling pulse output.

13. A generator according to claim 11, wherein said gate circuit includes:

a first AND gate for providing a first output corresponding to the logical AND of said second gate signal and said data signal;

a second AND gate for providing a second output corresponding to the logical AND of said first gate signal and said data signal;

a third AND gate for providing a third output corresponding to the logical AND of said second gate signal and an inverted signal of said data signal;

a fourth AND gate for providing a fourth output corresponding to the logical AND of said first gate signal and said inverted signal;

a first OR gate coupled to said second and third AND gates, for providing said up count signal corresponding to the logical OR of said second and third outputs; and a second OR gate coupled to said first and fourth AND gates, for providing said down count signal corresponding to the logical OR of said first and fourth output.

14. A generator according to claim 13, wherein said gate circuit further includes:

a fifth AND gate responsive to a clock signal having the same frequency as that of said sampling pulse output and to a clock gate signal, for providing a clock pulse corresponding to the logical AND of said clock signal and clock gate signal, and wherein said clock pulse is supplied as an AND input signal to each of said first to fourth AND gates, the frequency of said clock pulse defining the counting rate of said up/down counter.

15. A generator according to claim 10, wherein said second frequency converter is a frequency doubler and includes:

a delay element for delaying said clock run-in signal by a given time to provide a delayed signal;

a gate responsive to said delayed signal and clock run-in signal, for generating said clock signal when the logical level of said delayed signal is opposite to that of said clock run-in signal.

16. A generator according to claim 10, wherein said selector means, designation means and comparator means jointly form a closed negative feedback loop which operates to minimize the phase difference between said feedback signal and said clock run-in signal which is the control target of said feedback loop.

17. A generator according to claim 2, wherein said delay means includes a delay line having a plurarity of taps from which said delayed signals are outputted;

said control means includes an up/down counter for up or down counting said control signal, the counted result of said up/down counter determining the selection of said delayed signals at said selector means;

said comparator means includes a D type flip-flop whose D input receives a D input signal corresponding to said selected one delayed signal, whose clock input receives said reference phase signal, whose output provides a first comparison result and whose inverted output provides a second comparison result, said first and second comparison results being used as said comparison result; and said producing means includes a logic circuit responsive to said first and second comparison results and to said clock run-in signal, for providing an up count pulse according to said first comparison result and said clock run-in signal, and for providing a down count pulse according to said second comparison result and said clock run-in signal, said up and down count pulses being used as said control signal.

18. A generator according to claim 17, wherein said extracting means includes:

a delay element for delaying said symbolic data signal and providing a delayed data signal; and an EXOR gate whose one input receives said symbolic data signal, whose another input receives said delayed data signal and whose output provides said reference phase signal, and said comparator means further includes a frequency divider for dividing the frequency of said selected one delayed signal by 2 and generating said D input signal (P1).

* * * * *